M. CALDWELL.
COTTON CHOPPER.
APPLICATION FILED DEC. 20, 1909.

955,115.

Patented Apr. 12, 1910.

WITNESSES:
A. E. VanHorn
Jesse Bowling

INVENTOR
Mack Caldwell
BY Ashley Davis
ATTORNEYS

UNITED STATES PATENT OFFICE.

MACK CALDWELL, OF DUNCANVILLE, TEXAS, ASSIGNOR OF ONE-FOURTH TO J. A. WOLCOTT, OF GRAND PRAIRIE, TEXAS.

COTTON-CHOPPER.

955,115. Specification of Letters Patent. Patented Apr. 12, 1910.

Application filed December 20, 1909. Serial No. 534,067.

*To all whom it may concern:*

Be it known that I, MACK CALDWELL, citizen of the United States, residing at Duncanville, in the county of Dallas and State of Texas, have invented certain new and useful Improvements in Cotton-Choppers, of which the following is a specification.

This invention has relation to cotton choppers and particularly that class in which the chopper is attached to a cultivator.

The object of the invention is to provide opposed disks supported from the beams of a cultivator in divergent relation and in advance of the shovels.

A further object is to provide means for swinging the cultivator beams whereby the disks may be drawn together or moved apart.

Finally the object of the invention is to provide means of the character described that will be strong, durable, efficient, and easy of operation, simple and comparatively inexpensive to construct, and also in which the several parts will not be likely to get out of working order.

Figure 1:
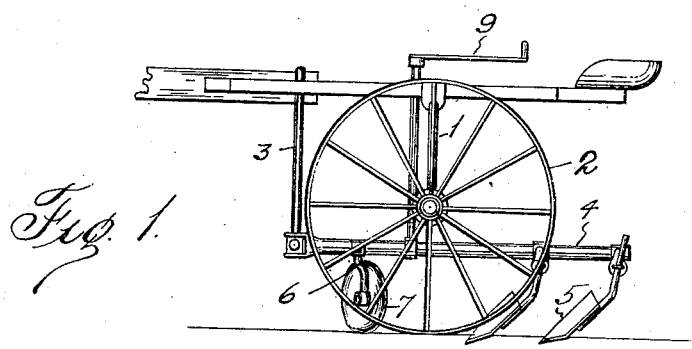
Figure 2:
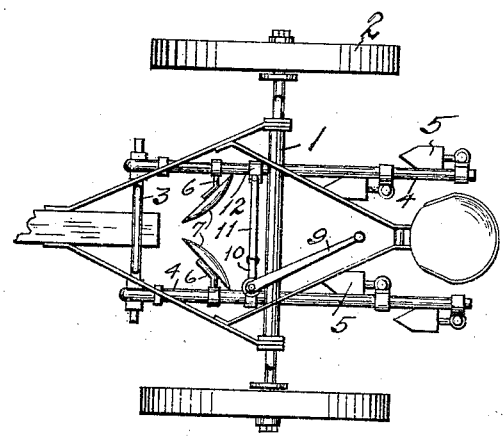
Figure 3:
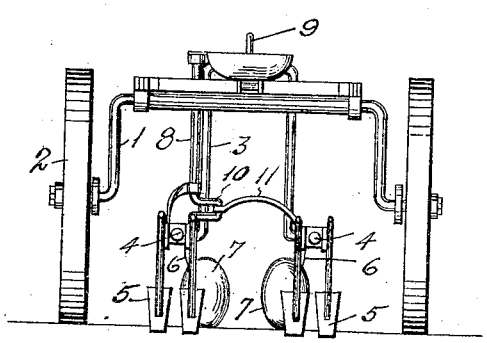

With the above and other objects in view, the invention has relation to certain novel features of construction and operation, an example of which is described in this specification and illustrated in the accompanying drawings, wherein:

Figure 1. is a side elevation of a riding cultivator with my cotton chopper attached thereto, Fig. 2. is a plan view of the same, and Fig. 3. is an end elevation.

In the drawings the numeral 1 designates the axle of an ordinary cultivator, 2 the ground wheel, 3 the forward arch, 4 the beams attached at their forward ends to the arch 3, and 5 the shovels.

The parts just described are of the usual construction and form no part of my invention.

On each beam 4 and near the forward end, a depending hanger 6 is rigidly secured. On the lower end of each hanger a disk 7 is mounted to rotate. It will be noted that the hangers 6 are curved and positioned to scrape the faces of the disks. Each disk is disposed at an angle and positioned on one side of the center of the cultivator so that the disks are held in divergent relation.

By swinging the cultivator beams 4 the disks may be brought together to chop the stalk and weeds and grass therearound or moved apart to permit the stalk to pass therebetween. For swinging the beams I mount a vertical crank rod 8 on one of the beams and support it at its upper end with a suitable attachment to the upper portion of the cultivator. On the upper end of the crank rod a rearwardly extending hand lever 9 is fastened and by which the crank rod may be rocked. The rod is provided with a laterally extending crank 10 having pivotal connection with one end of an arch bar 11 which is pivotally connected at its opposite end with a collar 12 on the other beam. It is obvious that by swinging the lever 9 the beams are swung as above described.

By arranging the disks in advance of the cultivator shovels and nearer the center of the machine it is obvious that the dirt turned over and thrown outward by the disks will be turned back and thrown inward by the shovels. It is also apparent that the operator has only to swing the lever 9 and bring the disks together to chop out the cotton or throw them apart and permit the stalks to pass therebetween.

What I claim is:

In a cotton chopper, the combination with the plow beams of a cultivator, of a hanger secured rigidly to each beam and depending therefrom, a single disk mounted to revolve on the lower end of each hanger, the hangers being so shaped as to direct the disks toward each other at an angle to the beams, a vertical crank rod mounted to swing on one of the beams, a crank extending laterally from the rod, an arch bar pivoted at one end to the crank and having pivoted connection at the other end with the other beam, and a horizontal handle lever extending rearwardly from the upper end of the vertical rod, the parts being arranged whereby the disks may be swung together or apart by the lever.

In testimony whereof I have signed my name to this specification in the presence of two subscribing witnesses.

MACK CALDWELL.

Witnesses:
JACK A. SCHLEY,
L. E. NOACK.